(12) United States Patent
Djadi et al.

(10) Patent No.: US 8,548,031 B2
(45) Date of Patent: Oct. 1, 2013

(54) ANTENNA DIVERSITY SYSTEM WITH FRAME SYNCHRONIZATION

(75) Inventors: Younes Djadi, Austin, TX (US); Russell Croman, Austin, TX (US); Scott Thomas Haban, Austin, TX (US); Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 650 days.

(21) Appl. No.: 12/649,761

(22) Filed: Dec. 30, 2009

(65) Prior Publication Data

US 2011/0158357 A1  Jun. 30, 2011

(51) Int. Cl.
*H04B 1/38* (2006.01)
*H04L 1/02* (2006.01)

(52) U.S. Cl.
USPC ............................ 375/219; 375/347; 455/273

(58) Field of Classification Search
USPC ................. 375/267, 347, 354, 219, 220, 257, 375/316; 455/132, 272, 273, 137
See application file for complete search history.

(56) References Cited

U.S. PATENT DOCUMENTS

| | | | |
|---|---|---|---|
| 4,380,767 A | 4/1983 | Goldstein et al. | |
| 4,450,585 A | 5/1984 | Bell | |
| 4,972,434 A | 11/1990 | Le Polozek et al. | |
| 6,172,970 B1 | 1/2001 | Ling et al. | |
| 6,614,770 B1 | 9/2003 | Kayama et al. | |
| 6,792,258 B1* | 9/2004 | Nokes et al. | 455/273 |
| 6,853,694 B1 | 2/2005 | Beaudin et al. | |
| 6,993,297 B2 | 1/2006 | Smith, Jr. | |
| 7,103,340 B2 | 9/2006 | Spencer et al. | |
| 7,103,830 B1 | 9/2006 | Dong | |
| 7,142,583 B2 | 11/2006 | Lysejko et al. | |
| 7,143,226 B2 | 11/2006 | Fields, Jr. et al. | |
| 7,403,066 B2 | 7/2008 | Williams | |
| 7,583,627 B2 | 9/2009 | Hirsch | |
| 8,072,995 B2 | 12/2011 | Lenell | |

(Continued)

FOREIGN PATENT DOCUMENTS

| | | |
|---|---|---|
| EP | 1646160 A2 | 6/2006 |
| EP | 1646157 A2 | 12/2006 |
| WO | 9908400 A2 | 2/1999 |

OTHER PUBLICATIONS

SMS1130—Integrated Single-Chip Mobile Digital TV Receiver with MRC Diversity, Siano Mobile Silicon (date unknown).

(Continued)

*Primary Examiner* — Betsy Deppe
(74) *Attorney, Agent, or Firm* — Cesari & Reed LLP; R. Michael Reed

(57) ABSTRACT

A tuner circuit includes circuitry to produce a first DSP frame based on a first RF signal and includes an inter-chip receiver circuit coupled to an inter-chip link and configured to receive an inter-chip frame. The inter-chip receiver circuit is configured to detect a start of frame symbol of the inter-chip frame and to extract a DSP offset and data related to a second DSP frame from the inter-chip frame. The tuner circuit further includes a digital signal processor coupled to the circuitry and to the inter-chip receiver circuit. The digital signal processor synchronizes the first DSP frame with the second DSP frame based on the start of frame symbol and the digital signal processor offset. The digital signal processor performs a selected antenna diversity operation on the first and second DSP frames to produce an output signal.

23 Claims, 11 Drawing Sheets

(56) References Cited

U.S. PATENT DOCUMENTS

| | | |
|---|---|---|
| 2002/0160737 A1 | 10/2002 | Crawford |
| 2006/0073797 A1 | 4/2006 | Kent et al. |
| 2006/0194562 A1 | 8/2006 | Marrah et al. |
| 2006/0286948 A1 | 12/2006 | Taniguchi et al. |
| 2007/0127609 A1* | 6/2007 | Kawada et al. .............. 375/347 |
| 2007/0135154 A1 | 6/2007 | Gautier et al. |
| 2008/0282005 A1 | 11/2008 | Chencinski et al. |
| 2009/0041169 A1* | 2/2009 | Fujita et al. ................. 375/354 |
| 2009/0080559 A1 | 3/2009 | Armbruster et al. |
| 2009/0207927 A1 | 8/2009 | Watanabe et al. |
| 2010/0062737 A1 | 3/2010 | Zhong et al. |
| 2010/0199158 A1* | 8/2010 | Friedman et al. ............ 375/220 |
| 2011/0158298 A1* | 6/2011 | Djadi et al. .................. 375/219 |
| 2011/0158339 A1* | 6/2011 | Tuttle et al. .................. 375/267 |
| 2011/0158357 A1 | 6/2011 | Djadi et al. |

OTHER PUBLICATIONS

SMS1140—Low-Cost Integrated Single-Chip MDTV Receiver with Full MRC Diversity, Siano Mobile Silicon (date unknown).

SMS1150—Integrated Single-Chip Mobile Digital TV Receiver with MRC Diversity, Siano Mobile Silicon (date unknown).

SMS1180 Single-Chip CMMB (S-TiMi) MDTV Receiver with Full MRC Diversity, Siano Mobile Silicon (date unknown).

Oren, Roy; "Unlimited Mobile TV: Enabling Deep-Indoor and In-Vehicle Reception of MDTV Using Antenna Diversity Technology," Siano Mobile Silicon, May 2009.

Janus Advanced USB2.0 Mobile Digital TV Receiver, Reference Design with Full Antenna Diversity and FM Radio, Siano Mobile Silicon (date unknown).

Wang, Chua-Chin, et al., High-Sensitivity and High-Mobility Compact DVB-T Receiver for In-Car Entertainment, 2006 Digest of Technical Papers. Issues 7-11 Jan. 2006 pp. 423-424.

Dual Receiver with Phase and Switched Diversity for Background Processing and Reception Improvement, SAE Technical Paper Series, Document 2008-01-1059, 2008 World Congress, Detroit, Michigan, Apr. 14-17, 2008.

Si4720/21 Broadcast FM Radio Transceiver for Portable Applications, Silicon Labs, Mar. 26, 2008.

Office Action in German Application No. 10 2010 062 964.2, dated Jan. 21, 2013 with English translation from "Google Translate".

Notice of Allowance and Fee(s) Due, U.S. Appl. No. 12/650,166, dated Aug. 9, 2012.

Non-Final Office Action, U.S. Appl. No. 12/649,911, dated Feb. 21, 2013.

* cited by examiner

| N | N mod 10 | Offset Period | K | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| 1790 | 0 | 1 | 0 | 0 | 0 | 0 | 0 | 0 | 0 | 0 | 0 | 0 | 0 | 0 |
| 1791 | 1 | 10 | 0 | 9 | 8 | 7 | 6 | 5 | 4 | 3 | 2 | 1 | 0 | 9 |
| 1792 | 2 | 5 | 0 | 8 | 6 | 4 | 2 | 0 | 8 | 6 | 4 | 2 | 0 | 8 |
| 1793 | 3 | 10 | 0 | 7 | 4 | 1 | 8 | 5 | 2 | 9 | 6 | 3 | 0 | 7 |
| 1794 | 4 | 5 | 0 | 6 | 2 | 8 | 4 | 0 | 6 | 2 | 8 | 4 | 0 | 6 |
| 1795 | 5 | 2 | 0 | 5 | 0 | 5 | 0 | 5 | 0 | 5 | 0 | 5 | 0 | 5 |
| 1796 | 6 | 5 | 0 | 4 | 8 | 2 | 6 | 0 | 4 | 8 | 2 | 6 | 0 | 4 |
| 1797 | 7 | 10 | 0 | 3 | 6 | 9 | 2 | 5 | 8 | 1 | 4 | 7 | 0 | 3 |
| 1798 | 9 | 5 | 0 | 2 | 4 | 6 | 8 | 0 | 2 | 4 | 6 | 8 | 0 | 2 |
| 1799 | 9 | 10 | 0 | 1 | 2 | 3 | 4 | 5 | 6 | 7 | 8 | 9 | 0 | 1 |
| 1800 | 0 | 1 | 0 | 0 | 0 | 0 | 0 | 0 | 0 | 0 | 0 | 0 | 0 | 0 |

ANTENNA DIVERSITY SYSTEM WITH FRAME SYNCHRONIZATION

FIELD

The present disclosure is generally related to an antenna diversity system with frame synchronization. More particularly, the present disclosure relates to a multi-chip antenna diversity system where the chips are interconnected through inter-chip communication links and configured to communicate with one another using inter-chip frames, which can be synchronized.

BACKGROUND

In mobile radio receivers, received radio frequency signals are frequently a combination of signals, some received directly from a transmitting antenna and some reflected from stationary and/or moving objects. In the worst case, the received signals from the direct and alternate path signals combine at the receiving antenna to cause destructive interference. Such interference makes decoding of the signals more difficult. Further, in some instances, interference can reduce the amplitude of the received signals to a level that is too low for reliable decoding by the receiver. Such amplitude reduction is sometimes referred to as multi-path fading.

One technique for improving signal reception under multi-path fading and weak signal conditions includes the use of multiple antennas and receiver circuits in an antenna diversity system. In a multi-chip antenna diversity system, multiple tuner circuits that are tuned to particular frequencies receive program content (channel information) from more than one direction or at slightly different positions. Such antenna diversity systems typically include processor circuitry configured to combine signals from the different tuners to produce an enhanced signal or to select a particular signal from a tuner having the strongest signal output.

Diversity reception makes use of statistically independent signal streams to reduce the impact of severe multipath-related channel fading. However, digital communications between the multiple tuner circuits and associated processing circuitry can radiate spectral energy at radio frequencies to which one or more of the tuner circuits are tuned, further complicating signal reception.

DETAILED DESCRIPTION OF ILLUSTRATIVE EMBODIMENTS

In an embodiment of an antenna diversity system, two or more antennas are spaced apart at a known distance and are configured to receive a radio frequency signal. The antenna diversity system includes two or more tuner circuits, where each tuner circuit is connected to a respective one of the two or more antennas and is configured to receive radio frequency signals within a particular frequency band or channel to which the tuner circuit is tuned. The tuner circuits are interconnected by inter-chip communications links and include inter-chip communications circuitry configured to communicate content from received radio frequency signals using inter-chip link frames.

Figure 1:
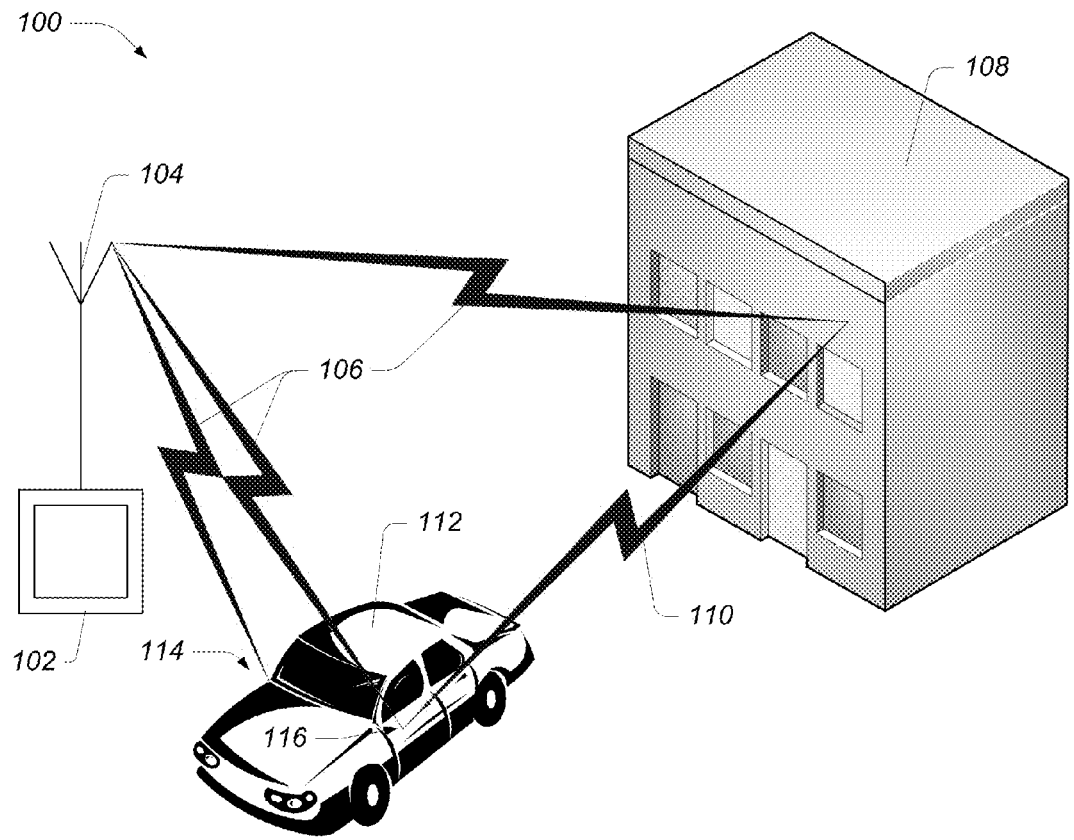
FIG. 1 is a diagram of a representative example of an antenna diversity system in one possible representative environment.

FIG. 1 is a diagram of a representative example of an antenna diversity system 100 in one possible representative environment out of many possible environments. The system 100 includes a base station or transmitting station 102 having an antenna 104 that is configured to transmit content through radio frequency signals 106. The content may include radio program content, television or multimedia program content, voice data, control information, other content, or any combination thereof.

The system 100 also includes a vehicle 112 that has an antenna diversity system including a first antenna 114 and a second antenna 116 to receive the radio frequency signal 106 and to receive reflected signals, such as reflected signal 110, which may be reflected by a structure, such as building 108. The antenna diversity system within the vehicle 112 is configured to perform a selected antenna diversity operation on the radio frequency signal 106 and the reflected signal 110 to produce an output signal including the content from the signals 106 and 110, which content can be delivered to a speaker, a display device, a computer, a data Storage device, another device, or any combination thereof.

In an embodiment, the antenna diversity system within the vehicle 112 is configured to tune to a particular radio frequency program, such as a radio station. As the vehicle 112 moves and the received radio frequency signals 106 and 110 vary, the antenna diversity system is adapted to constructively combine content from the radio signals 106 and 110 to provide substantially consistent reception and playback, for example, through a radio of the vehicle 112. In some instances, the antenna diversity system can be configured to scan for the program content on different radio frequencies and to switch to a different radio frequency channel to continue receiving the program content, when the signal quality is better on another radio frequency.

Figure 2:
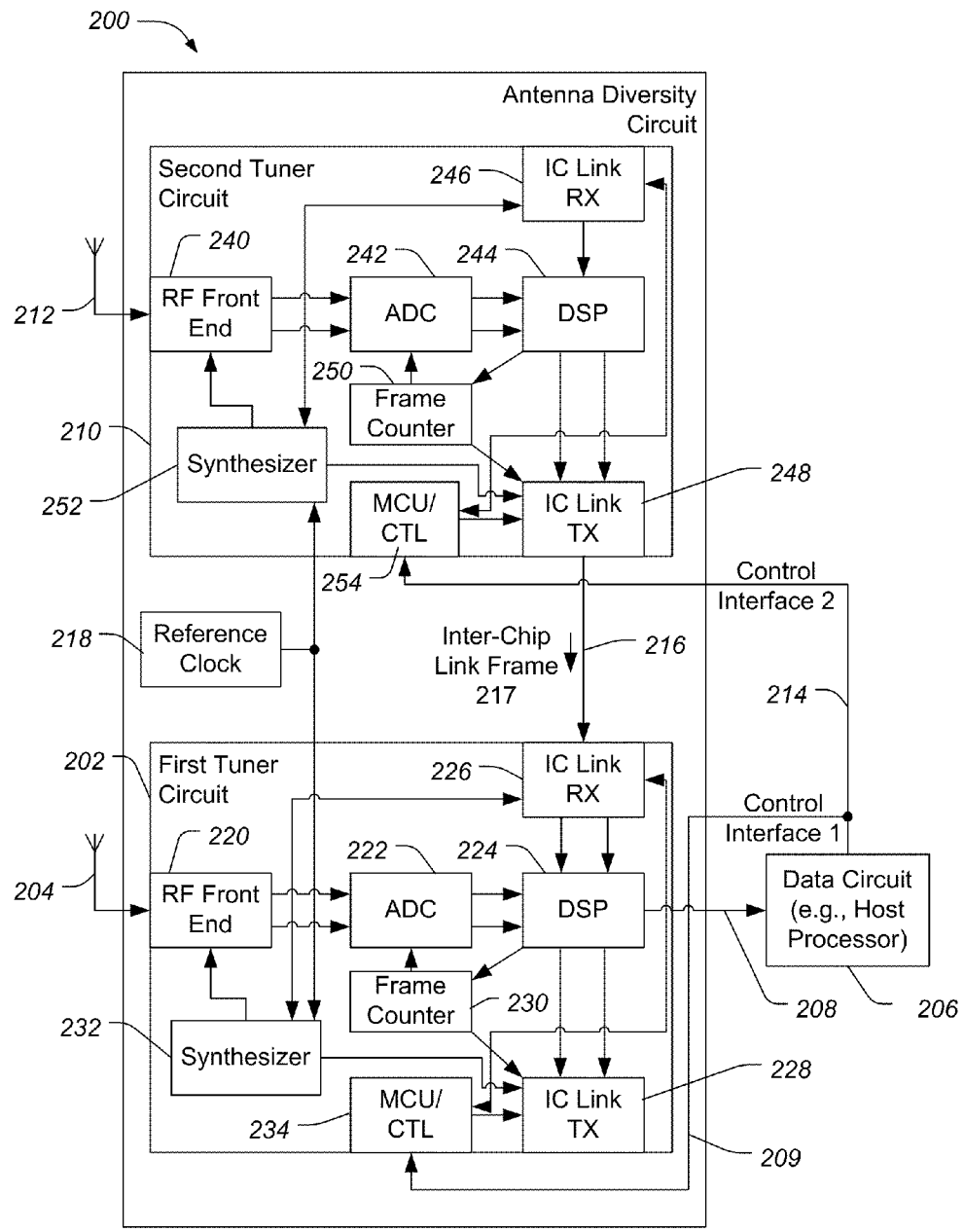
FIG. 2 is a block diagram of an embodiment of an antenna diversity system configured to synchronize inter-chip link frames.

FIG. 2 is a block diagram of an embodiment of an antenna diversity circuit 200 configured to synchronize inter-chip link frames. The antenna diversity circuit 200 includes a first tuner circuit 202 connected to a first antenna 204 and a second tuner circuit 210 connected to a second antenna 212. The first and second tuner circuits 202 and 210 are connected through an inter-chip communication link 216, which may be a low-voltage differential signal link.

In the antenna diversity circuit 200, the first and second tuner circuits 202 and 210 are arranged in a daisy-chain configuration, where the first tuner circuit 202 is connected through a digital interface 208 to a data circuit 206, such as a host processor, digital logic, other circuitry, or any combination thereof. The second tuner circuit 210 is coupled to the data circuit 206 through the inter-chip communication link 216 and through the first tuner circuit 202. In the daisy-chain configuration, if other tuner circuits are added, the next tuner circuit would be connected to the data circuit 206 through another inter-chip communication link, the second tuner circuit 210, the inter-chip communication link 216, the first tuner circuit 202, and the digital interface 208.

The first tuner circuit 202 includes a radio frequency (RF) front end circuit 220 connected to the first antenna 204 to receive a radio frequency signal. The front end circuit 220 is connected to a synthesizer 232 to receive a clock signal and to an analog-to-digital converter (ADC) 222, which is connected to a digital signal processor (DSP) 224. The DSP 224 is connected to inter-chip communication circuitry, including an inter-chip (IC) link receiver circuit 226 and an IC link transmitter circuit 228. The IC link receiver circuit 226 is connected to the inter-chip communication link 216 to receive the inter-chip link frames 217. The DSP 224 is also connected to a frame counter 230, which is connected to the ADC 222 and to the IC link transmitter circuit 228. The first tuner circuit 202 also includes control circuitry 234, such as a micro-control unit (MCU), which is connected to the data circuit 206 through a control interface 209 and which is configured to control operation of the first tuner circuit 202.

The second tuner circuit 210 includes a RF front end circuit 240 connected to the second antenna 212 to receive a radio frequency signal. The front end circuit 240 is connected to a synthesizer 252 to receive a clock signal and to an ADC 242, which is connected to a DSP 244. The DSP 244 is connected to inter-chip communication circuitry, including an IC link receiver circuit 246 and an IC link transmitter circuit 248. The IC link transmitter circuit 248 is connected to the inter-chip communication link 216 to send data related to received RF signals within IC link frames 217 to the first tuner circuit 202. The DSP 244 is also connected to a frame counter 250, which is connected to the ADC 242 and to the IC link transmitter circuit 248. The second tuner circuit 210 also includes control circuitry 254, such as an MCU, which is connected to the data circuit 206 through a control interface 214 and which is configured to control operation of the second tuner circuit 210.

The antenna diversity circuit 200 further includes a reference clock 218, which is connected to the first and second tuner circuits 202 and 210 to provide a clock signal. In an embodiment, the frequency of the clock signal produced by the reference clock 218 is programmable and is selected so that the clock frequency and its harmonics are outside of a frequency band to which the tuner circuits 202 and 210 are tuned.

In an embodiment, the first and second tuner circuits 202 and 210 can include the same circuit components, but the first and second tuner circuits 202 and 210 are independently controllable by the data circuit 206 through control interfaces 209 and 214. Further, while two tuner circuits (first and second tuner circuits 202 and 210) are depicted, the antenna diversity circuit 200 can include any number of tuner circuits, depending on the implementation.

In an embodiment, the synthesizers 232 and 252 receive the clock signal from the reference clock 218 and produce clock signals, which are used by the RF front end circuits 220 and 240 to mix with received radio frequency signals to produce intermediate frequency (IF) signals. As used herein, the term "IF signal" refers to a signal at any suitable intermediate frequency, such as low IF or zero IF. The IF signals are digitized by the ADCs 222 and 242 and digitized versions of the IF signals are provided to DSPs 224 and 244, respectively. The DSPs 224 and 244 are configured to process the digitized versions of the IF signals.

In the embodiment shown in FIG. 2, the second tuner circuit 210 is connected to the first tuner circuit 202, but the IC link receiver circuit 246 is not connected to any other tuner circuit. Accordingly, the DSP 244 generates signal metrics associated with the digitized version of the IF signal, and provides the digitized version of the IF signal and the associated signal metrics to the IC link transmitter circuit 248.

The IC link transmitter circuit 248 supports multiple channels to transfer the digitized version of the IF signal, the associated quality metrics (such as signal-to-noise ratio (SNR), receive signal strength indicator (RSSI), other quality metrics, etc.), digital audio data for switched antenna diversity and alternate frequency scan modes, and control data. The IC transmitter circuit 248 is coupled to the control circuit 254 to receive the control data and is configured to send the control data to the control circuit 234 of the first tuner circuit 202. The IC transmitter circuit 248 is configured to assemble the digitized version of the IF signal or digital audio data, the associated quality metrics, and the control data into one or more IC link frames 217. Each IC link frame 217 includes a start symbol and DSP offset information, which can be used to synchronize the first tuner circuit 202 to the same DSP frame timing. Since the DSPs 224 and 244 process the IF samples in batches within DSP frames, the DSP frame at the first tuner circuit 202 is synchronized to the DSP frame of the second tuner circuit 210 based on the synchronization portion of the IC link frame 217.

The reference clock 218 allows the IC link transmitter circuit 248 and the IC link receiver circuit 226 to have the same clock frequency, which simplifies tuning of the first and second tuner circuits 202 and 210 to the same frequency band or channel and which simplifies data recovery. Further, since the clock signal is not sent from the second tuner circuit 210 to the first tuner circuit 202 over the IC communication link 216, the number of pins needed to support clock interconnect wiring is reduced. Additionally, radiated interference due to clock switching is reduced.

The IC link transmitter circuit 248 generates an IC link frame 217 that includes multiple channels to carry the signal data, the quality metrics, and the control data. Additionally, each frame includes a synchronization portion that is used by the IC link receiver circuit 226 to synchronize the DSP frames. The operation of the IC link transmitter circuit 248 is discussed in detail below with respect to FIGS. 6 and 7.

The IC link receiver circuit 226 receives data via the IC link frame 217, decodes the frame, and provides the signal data, the quality metrics, the synchronization information, to the DSP 224 to process the received signal data with a digitized version of the IF signal from the ADC 222. Further, the IC link receiver circuit 226 provides control information to the control circuit 234, which controls operation of the DSP 224. The operation of the IC link receiver circuit 226 is discussed in detail below with respect to FIGS. 8 and 9.

In general, the DSPs 224 and 244 are controlled by control circuits 234 and 254, respectively, to process the signal data according to a selected operating mode, such as a phase diversity mode, a switching antenna mode, or an alternate frequency scan mode. In a phase diversity mode, the digital signal processor 224 synchronizes DSP frames including the digitized version of the IF signal and signal data within the IC link frame 217 from the IC communication link 216, and performs maximal ratio combining or other similar digital signal processing techniques to coherently combine the IF signal from first and second tuner circuits 202 and 210 and to provide the combined signal to the data circuit 206 through a digital interface 208.

In a switching antenna mode, the first and second tuner circuits 202 and 210 operate independently, and the signal reception is improved by continuously monitoring the signal quality metrics calculated from the digitized version of the IF signal as compared to the IF signal metrics received within the IC link frames 217 from the IC communication link 216. In this operating mode, the DSP 224 is configured to select between the signal from the first antenna 204 and the signal from the second antenna 212 based on the signal metrics and to provide the stronger signal to the data circuit 206 through the digital interface 209.

In an alternate frequency scan, the data circuit (host processor) 206 controls the first and second tuner circuits 202 and 210 to use the IC communication link 216 to continue listening to a selected one of the first and second tuners 202 and 210 having the strongest signal and controls the other tuner to tune to the same content in another frequency band to check the associated signal quality metrics. Depending on the results, the data circuit (host processor) 206 may decide to control the first and second tuners 202 and 210 to operate in phase diversity mode or switched antenna diversity mode at the new frequency.

As mentioned above, the digitized version of the IF signal from the second tuner circuit 210 can be communicated to the first tuner circuit 202 through the inter-chip communication link 216 using IC link frames 217. The structure of the IC link frame 217 is discussed below in FIG. 3.

Figure 3:
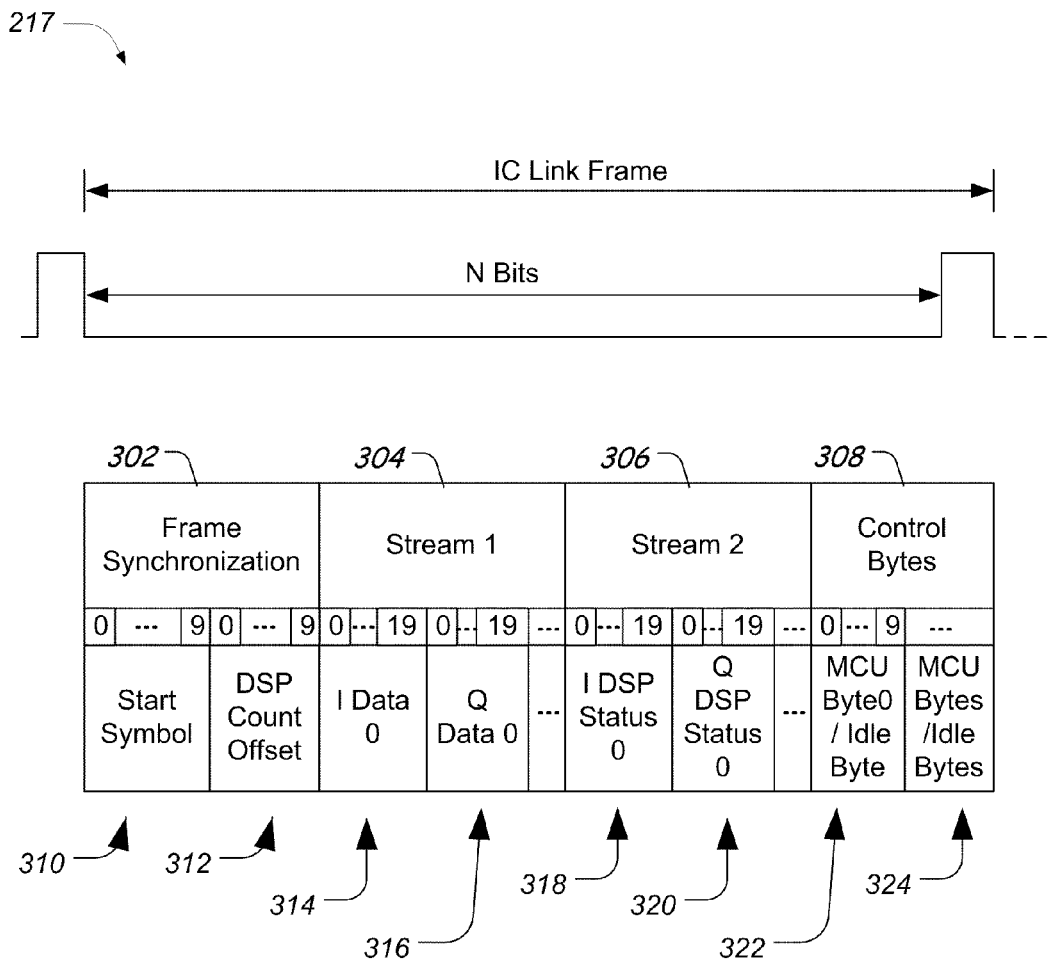
FIG. 3 is a diagram of an embodiment of an inter-chip link frame including data transmitted between tuner chips through an inter-chip communication link of the antenna diversity system of FIG. 2.

FIG. 3 is a diagram of an embodiment of an IC link frame 217 including IF data transmitted between tuner chips of the antenna diversity system of FIG. 2. The IC link frame 217 has a programmable width configured to carry a number of bits (N). The IC link frame 217 includes a frame synchronization field 302, a data samples field 304, a status samples field 306, and a control field 308.

The frame synchronization field 302 includes two 10-bit symbols, including a start symbol 310 and a DSP count offset symbol 312. In an example where the IC link frame 217 includes data samples encoded using 8-bit/10-bit encoding, the start symbol 306 is a frame start synchronization symbol called a K28.5 comma that is sent at the start of every DSP frame. Eight-bit/ten-bit encoding (sometimes called 8-bit/10-bit or 8b/10b encoding) is a line code that maps 8-bit symbols to 10-bit symbols to achieve DC-balance and bounded disparity, while providing sufficient state changes to allow reasonable clock recovery. In other words, the difference between the count of 1s and 0s in a string of at least 20 bits is no more than 2. Further, there are not more than five 1s or 0s in a row, which helps to reduce the demand for a lower bandwidth limit of the channel necessary to transfer a signal. In this scheme, eight bits of data are transmitted as a 10-bit entity called a symbol, or character. The low 5 bits of data are encoded into a 6-bit group (a 5b/6b portion) and the top three bits are encoded into a 4-bit group (the 3b/4b portion). These code groups are concatenated together to form the 10-bit symbol that can be transmitted over a communication link, such as the IC communication link 216.

In this example, the DSP count offset symbol 308 is a scrambled, 8-bit/10-bit coded version of the eight least significant bits from the DSP frame counter 230. The DSP count offset symbol 308 is included within the synchronization portion 302 of each IC link frame 217 immediately following the start symbol 306.

The data samples field 304 is configured to carry a high bandwidth data stream. The data samples field 304 has a programmable bandwidth. The data samples field 304 includes in-phase data 314 and quadrature data 316. When operating in a phase diversity mode, the data samples field 304 carries the DSP IF data stream or other types of DSP data in other operating modes.

The status samples field 306 has a programmable bandwidth. The status samples field 306 carries in-phase and quadrature data 318 and 320, such as signal metrics or other data. In the phase diversity mode and in the switching antenna mode, the status samples field 306 carries the signal metrics for the IF data in the data samples field 304. In an alternate frequency scan mode, the status samples field 306 may also carry other types of data, such as the demodulated audio data, which can be provided, for example, from the second tuner circuit 210 to the data circuit 206 through the first tuner circuit 202.

The control field 308 is a low bandwidth control channel or field that carries micro-control unit (MCU) control packets. The start and end of the MCU control packets can occur within any IC link frame 217. The control field 308 carries a micro-control unit (MCU) byte 0/idle byte 322 and MCU bytes/idle bytes, which may carry control data to control operation of the receiving tuner circuit. For example, the control data may be sent from the second tuner circuit 210 within the control field 308 of the IC link frame 217 to control operation of the first tuner circuit 202. The control field or channel is synchronized to the IC link frame 217, but the information contained in the control field 308 is asynchronous to the information contained in the data and status fields in the IC link frame 217. Further, the control field 308 is included within the IC link frame 217 after the data streams are sent. The control data can be sent over multiple IC link frames 217.

To combine signals and/or to compare signal strengths effectively within the DSP of the first tuner circuit 202, synchronization of the DSP frame of the first tuner circuit 202 to that of the second tuner circuit 210 is important. In an embodiment, IC link receiver 226 of the first tuner synchronizes the DSP frame counter 230 to the second tuner's DSP frame counter 250, by acting on the frame synchronization fields 302, which it receives from the second tuner's IC link transmitter 248.

It should be understood that the DSP frame can be any integer number of clock cycles in length. The period of the clock is the same length as each bit period of the data that is being sent across the IC link 216.

Figure 4:
FIG. 4 is a table of digital signal processor frame offsets for an inter-chip link frame for different frame lengths.

FIG. 4 is a table 400 of digital signal processor frame offsets for an IC link frame 217 for different DSP frame lengths. In this example, the IC transmitter circuit 248 uses an 8-bit/10-bit encoding scheme. Accordingly, the IC link frame 217 consists of an integer number of 8b/10b symbols; therefore, the bit length of the IC link frame 217 is always a multiple of 10. To account for the case where the number of bit clock cycles in a DSP frame is not a multiple of 10, a DSP offset is included to synchronize the DSP frames to account for the size difference of the IC link frame 217.

In the case where the number of bit clock cycles in a DSP frame is also an integer multiple of 10, the synchronization is achieved by using start symbol 310 of the IC link frame 217 to synchronize the DSP frames on both tuner circuits. The second tuner circuit 210 masters the IC communication link 216 and controls the first tuner circuit 202 to synchronize its DSP frame counter 230 to the start symbol 310 of the IC link frame 217. After adjusting for latency of the IC communication link 216, the two DSP frames can be synchronized within the DSP 224 of the first tuner circuit 202.

In the more general case where the DSP frame length is not an integer multiple of 10, the start symbol 310 of the IC link frame 217 includes a non-zero DSP count offset 312 to define the offset between the IC link frame 217 and the start of the DSP frame of the first tuner circuit 202. To ensure that the DSP frame pulses on the first tuner circuit 202 are within one clock cycle from the transmitted DSP frame pulse, the bit offset 312 of the start symbol 310 of the IC link frame 217 relative to the DSP frame pulse is sent within each IC link frame 217. Within the first tuner circuit 202, the received DSP 312 offset is adjusted for latency of the IC communication link 216 and is then loaded into the DSP frame counter 230.

If N is the length of the DSP frame in clock cycles of the IC communication link 216, then after K numbers of DSP frames, the IC link frame offset 312 can be calculated according to the following equation:

$$\text{IC Link Frame Offset } 312 = (K*(10-(N \bmod 10))) \bmod 10 \quad \text{(Equation 1)}$$

Figure 7:
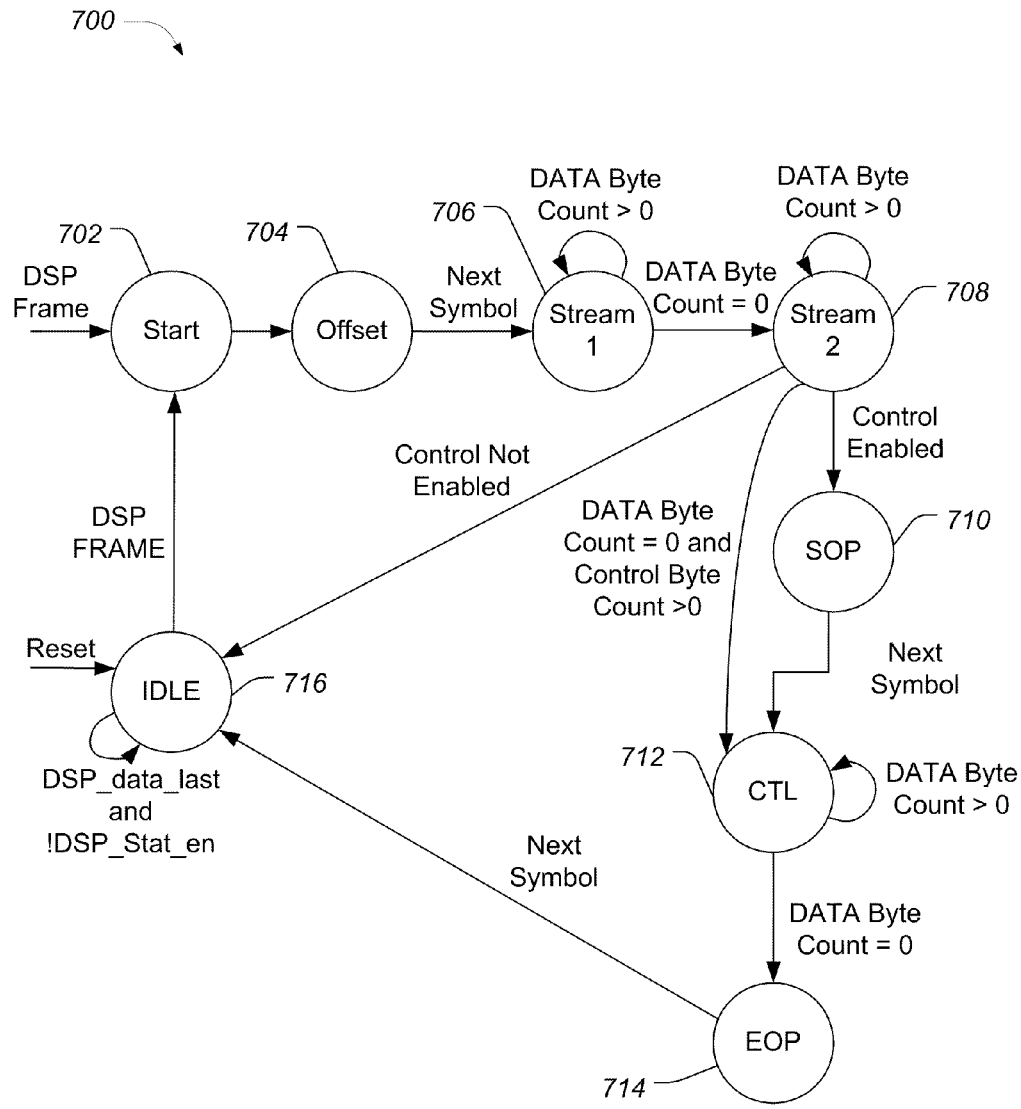
FIG. 7 is a state diagram illustrating a representative example of the operation of the inter-chip link transmitter circuit of FIG. 6.

In Equation 1, the variable (K) represents a number of DSP frames, which number may be provided by a DSP frame counter, such as the DSP frame counter 250 (depicted in FIGS. 2 and 7). As shown in the table 400, the IC link frame offset 312 relative to the DSP frame remains always between 0 and 9 and changes from frame to frame depending on the DSP frame length. Further, the IC link frame offset 312 depends only on the least significant digit of the frame length (N mod 10). Moreover, the IC link frame offset 312 is periodic with a period of at most 10 IC link clock cycles.

Selecting a particular example, for a DSP frame of 1791 bits, the DSP frame is nine bits away from the next multiple of 10 (i.e. 1800 bits). Accordingly, the first IC link frame 217 has an offset 312 of zero. The second IC link frame has an offset of nine. The third IC link frame has an offset of eight, and so on.

In the example provided in FIG. 4, the number of bits (N) is just one example out of many possible examples. The number (N) could be any number, since the offset depends on the modulus of the number (N) relative to the base number of the coding scheme.

Figure 5:
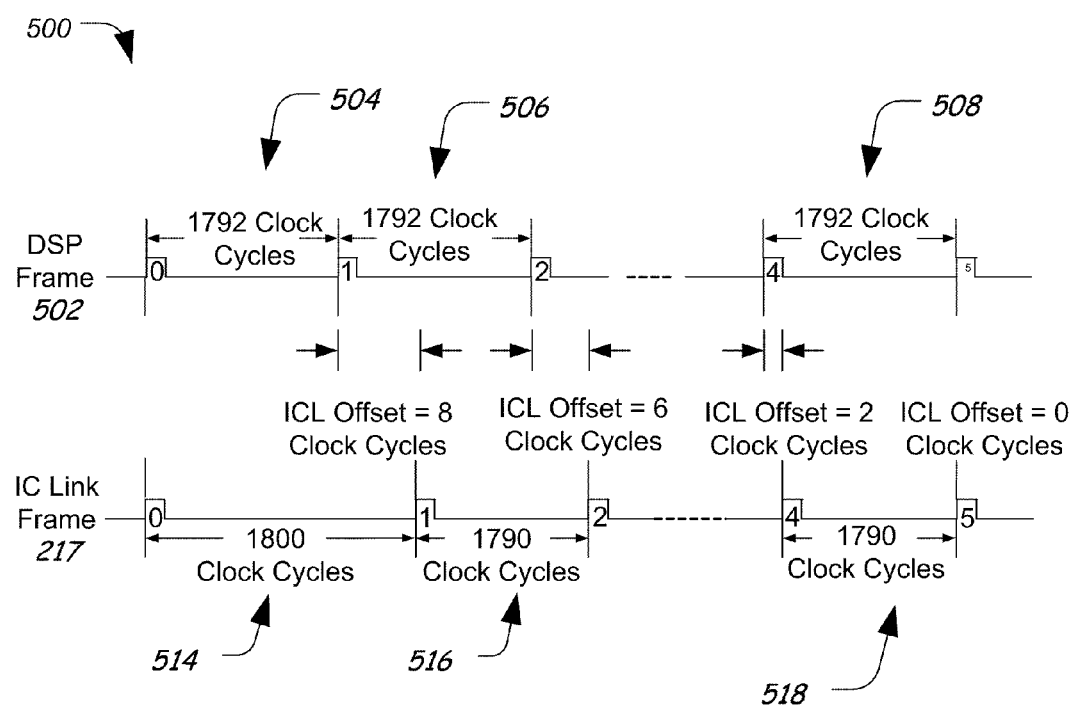
FIG. 5 is a timing diagram of a digital signal processor frame and an inter-chip link frame for a digital signal processor frame having a bit length of 1792 bits.

FIG. 5 is a timing diagram 500 of digital signal processor frames 502 and IC link frames 217 for a digital signal processor frame having a bit length of 1792 bits. The digital signal processor frames 502 include first, second, and fifth frames 504, 506, and 508. The IC link frames 217 include a first IC link frame 514 that includes a zero offset, a second IC link frame 516 including an eight-bit offset, and a fifth IC link frame 518 including a two-bit offset.

Figure 6:
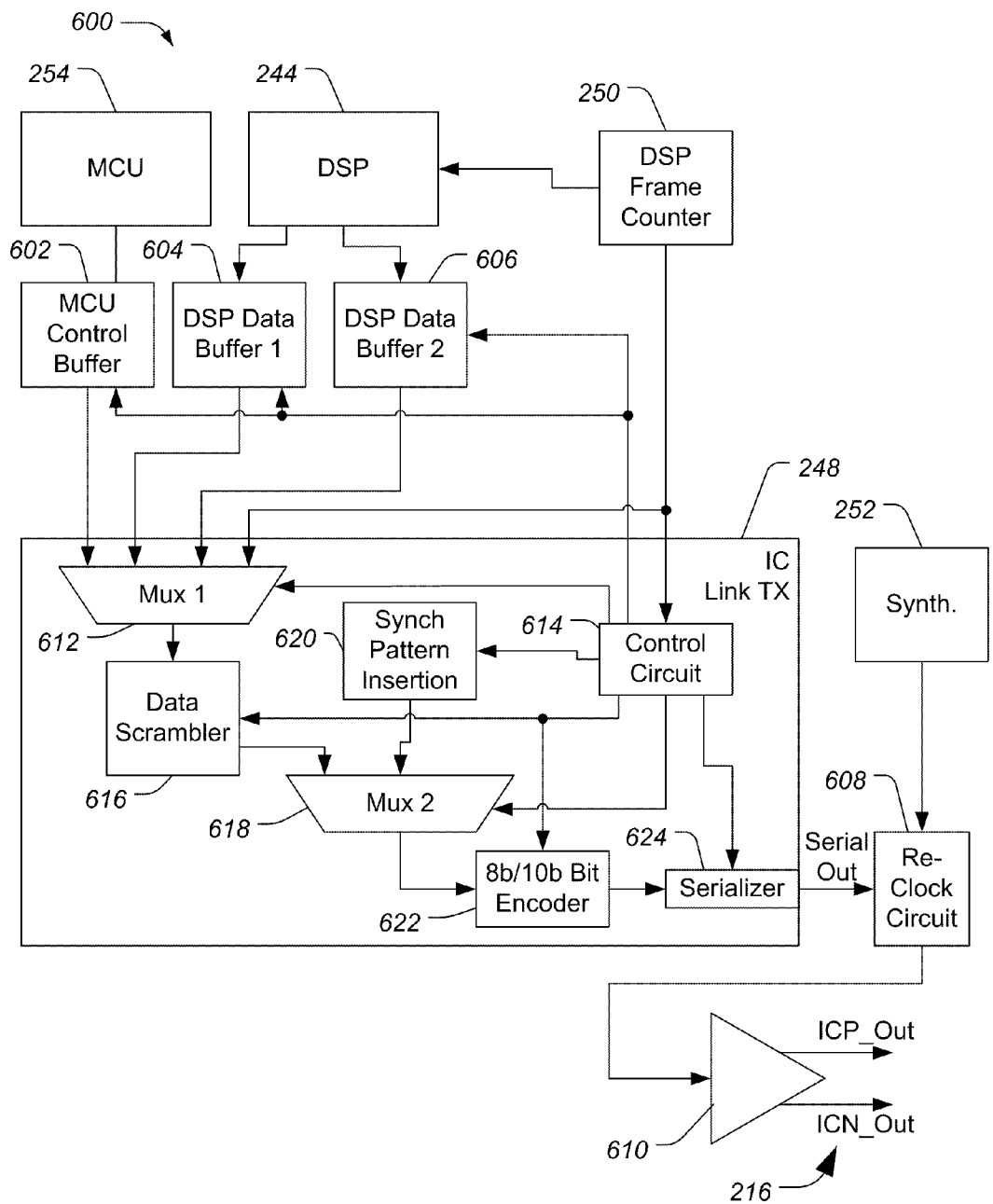
FIG. 6 is a partial block diagram and partial circuit diagram of an embodiment of a circuit including an inter-chip link transmitter circuit.

FIG. 6 is a partial block diagram and partial circuit diagram of a circuit 600 including the embodiment of a inter-chip link transmitter circuit 248 depicted in FIG. 2. The circuit 600 includes the IC link transmitter circuit 248 coupled to the control circuit (MCU) 254 through an MCU control buffer 602 and coupled to the DSP 244 through DSP data buffers 604 and 606. Additionally, the IC link transmitter circuit 248 is connected to the DSP frame counter 250. The DSP frame counter 250 is a programmable counter that generates a DSP frame signal, which synchronizes the start time of the IC link transmitter circuit 248 to other DSP blocks.

The circuit 600 further includes the synthesizer 252, which is connected to a re-clock circuit 608. The re-clock circuit 608 is connected to the IC link transmitter circuit 248 to receive a serial output data stream and is connected to a low-voltage differential signal (LVDS) driver circuit 610 to transmit IC link frames 217 to the first tuner circuit 202 over the IC communication link 216.

The IC link transmitter circuit 248 includes a control circuit 614, which is a timing control circuit that controls operation of the IC link transmitter circuit 248. The control circuit 614 is connected to the DSP frame counter 250 to receive frame count information. The control circuit 614 is also connected to MCU control buffer 602 and to data buffers 604 and 606 to control the transfer of information from the buffers to a first multiplexer 612. The control circuit 614 is also connected to a selection input of the first multiplexer 612 to control the multiplexer selections.

The control circuit 614 is connected to a synchronization pattern insertion circuit 620, which inserts a synchronization pattern at the beginning of every DSP frame. In an embodiment, the synchronization pattern is a K27 synchronization pattern.

The control circuit 614 controls the first multiplexer 612 to select the appropriate data to be sent in a current field of the IC link frame 217. For the case of DSP data, the data words from the second tuner circuit 210 are disassembled into bytes by the IC link transmitter circuit 248. The DSP words can be 2-bytes or 3-bytes wide.

The output of the first multiplexer 612 is provided to data scrambler 616, which is controlled by the control circuit 614. The data scrambler 616 performs data scrambling on the data byte to be transmitted using a 15-bit polynomial: $x^{15}+x^{14}+1$. The data scrambler 616 is included to whiten the spectral density of signals transmitted through the IC communication link 216, reducing radiated spectral energy that can interfere with reception at the RF front end circuit 240. The data scrambler 616 provides the scrambled output to a second multiplexer 618, which is controlled by control circuit 614.

The second multiplexer 618 receives the scrambled output from the data scrambler 616 and a synchronization pattern from the synchronization pattern insertion circuit 620. The control circuit 614 controls the second multiplexer 618 to provide an appropriate output to an eight-bit to ten-bit (8-bit/10-bit) encoder 622.

The 8-bit/10-bit encoder 622 encodes data bytes into 10 bit symbols using 8b/10b linear coding, which provides unique symbols that can be used for framing and which includes sufficient data state transitions to facilitate data recovery as well as the ability to detect many types of errors.

The 8-bit/10-bit encoder 622 provides the encoded data to serializer 624, which is controlled by control circuit 614 to provide the serial output to the re-clock circuit 608. The serializer 624 loads the coded 10 bit symbols every symbol boundary, and shifts the data serially to the output at a rate determined by the IC link clock.

The re-clock circuit 608 uses a clock signal from synthesizer 252 (a local oscillator clock), which also clocks the mixer within the RF front end circuit 240. The re-clock circuit 608 re-clocks the serialized, scrambled data. The clock frequency used by the re-clock circuit 608 can be selected to place spectral nulls in the output power spectrum of the output signal at a desired frequency and its harmonics. The desired frequency can be the IF frequency or the radio frequency channel to which the tuner circuits 202 and 210 are tuned. The re-clock circuit 608 provides the re-clocked serial signal to the LVDS driver 610, which converts the single ended digital signal from the re-clock circuit 608 into a low voltage differential signal for transmission over the IC communication link 216.

In operation, a programmable number of stereo (in-phase and quadrature) DSP data words are read every DSP frame from the transmit DSP data buffer 604 in the second tuner circuit 210 and are written three DSP samples later in a receive DSP data buffer 802 (depicted in FIG. 8) within the first tuner circuit 202. Additionally, a programmable number of stereo DSP data words are read every DSP frame from the transmit DSP data buffer 606 in the second tuner circuit 210 and written 3 DSP samples later in the receive DSP data buffer 806 (depicted in FIG. 8) within the first tuner circuit 202. In an example, the DSP data words are "written 3 DSP samples later" refers to a position in the receiving DSP data buffer 806 relative to the position of the data word in the transmit DSP data buffer 606. After the MCU 254 writes the control packet to the MCU control buffer 602, the MCU 254 enables the packet transmission by setting a control bit in an IC TX control register within control circuit 614.

FIG. 7 is a state diagram 700 illustrating a representative example of the operation of the inter-chip link transmitter circuit of FIG. 6. Within the state diagram 700, the state machine is at an idle state 716 prior to receipt of a DSP frame start from DSP frame counter 250, after a reset, or after all data and control bytes have been sent. In this state, 0×00 bytes are scrambled, 8b/10b encoded, and loaded into the serializer 624.

The state machine transitions to a start state 702 when the beginning of a DSP frame is detected. In this state the K28.5 symbol, which indicates the start of IC link frame 217, is loaded into the serializer 624. Then, the state machine transitions next to the offset state 704. In the offset state 704, the DSP counter offset 312 is scrambled then loaded to the serializer 624. Then, the state machine transitions next to the stream 1 state 706.

When the state machine transitions to the stream 1 state 706, the data byte counter is loaded with the number of data bytes to be sent within the first data field or channel 304, and counts down after each byte is scrambled, 8b/10b encoded, and loaded to the serializer 624. In the stream 1 state 706, data from the digitized version of the IF signal are placed within the data field 304 of the IC frame 217. When the byte counter reaches zero, the state machine transitions to a stream 2 state 708.

As the state machine transitions to the stream 2 state 708, the data byte counter is loaded with the number of data bytes to be sent using the second data field or channel 306, and counts down after each byte is sent. In this state, the IC link transmitter 248 loads the second data field 306 with appropriate data, such as signal quality metrics associated with the digitized version of the If signal. When the byte counter reaches zero, the state machine transitions to the start of packet (SOP) state 710 if the control field or channel 308 is enabled. Otherwise, the state machine transitions to the idle state 716.

In the start of packet state 710, the K.28.2 symbol is loaded into the serializer 624, and the state machine always transitions to the control state 712. As the state machine transitions to the control state 712, the control byte counter is loaded with the number of the remaining control bytes to be sent over the control channel 308. In this state, the control circuit 254 of the second tuner circuit 210 provides control data to the MCU control buffer 602, which control data can be multiplexed into the control field 308 of the IC link frame 217. In an example, the control data may be sent over multiple IC link frames 217.

When the control byte counter is zero, the state machine transitions to an end of packet state 714. In the end of packet state 714, the K.27.7 symbol is loaded into the serializer 624. The state machine then transitions to the idle state 716. The state machine continues to process DSP frames into IC link frames 217.

Figure 8:
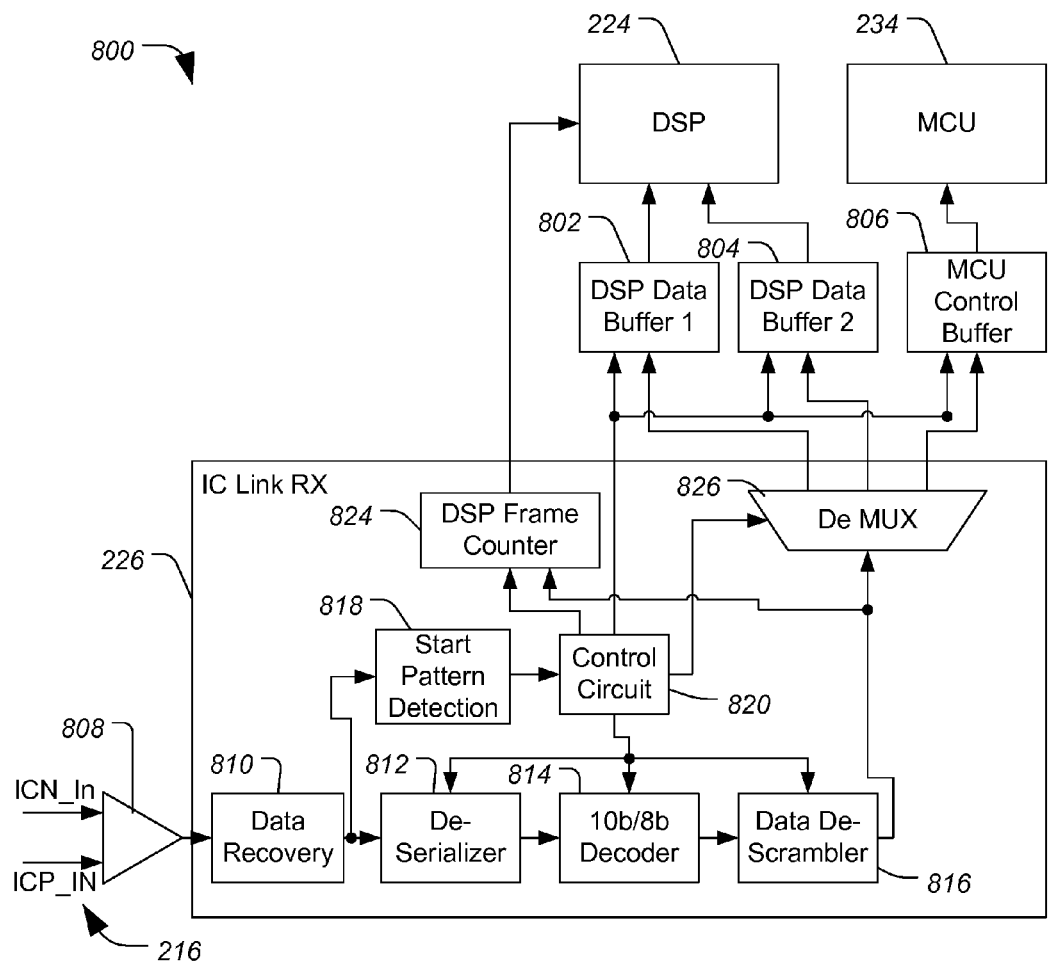
FIG. 8 is a partial block diagram and partial circuit diagram of an embodiment of a circuit including an inter-chip link receiver circuit.

FIG. 8 is a partial block diagram and partial circuit diagram of an embodiment of a circuit 800 including an inter-chip link receiver circuit 226. The inter-chip receiver circuit 226 is connected to the DSP 224 through data buffers 802 and 804 and is connected to control circuit (MCU) 234 through MCU control buffer 806. Additionally, the inter-chip receiver circuit 226 is connected to IC communication link 216 through LVDS receiver circuit 808.

The LVDS receiver circuit 808 receives the low voltage differential signal (LVDS) on the IC communication link 216, amplifies it and converts to a single-ended digital signal. The LVDS receiver circuit 808 provides the singled-ended digital signal to a data recovery circuit 810, which recovers data from the LVDS input with the assumption that, on average, the bit rate of the received data is equal to the sampling clock frequency.

The data recovery circuit 810 is configured to operate in one of two modes: a low-jitter tracking mode and a high-jitter non-tracking mode. In the low-jitter tracking mode, a high-speed clock is used to generate a delayed version of the singled-ended digital signal. The data recovery circuit 810 clocks the delayed version and the single-ended digital signal with both rising and falling edges of a clock signal to produce four samples of the content of the singled-ended digital signal. The data recovery circuit 810 uses the four samples to detect the location of data transitions relative to the rising and falling edges of the clock signal. The data recovery circuit 810 uses the data transition information to select the particular sample that is furthest from a clock edge. If the phase error between the synthesizer 252 of the second tuner circuit 210 and the synthesizer 232 of the first tuner circuit 202 accumulates to the point where the sampled data becomes too close to the clock transitions, then the data recovery circuit 810 automatically selects another sampled data that is further from clock transitions without causing data errors.

In a high-jitter non-tracking mode, the data recovery circuit 810 uses both edges of a high speed clock signal to delay the input through a tapped delay line and to detect rising and falling edges of an IC link clock (e.g., a clock signal from synthesizer 232). When the rising or falling edge of the IC link clock is detected, the data recovery circuit 810 locates the taps where data transitions occur within the IC link frame 217 relative to the clock transitions. After a couple of frames, the data recovery circuit 810 identifies the taps that exhibit no data transition and selects the tap which is the farthest from any data transition as the recovered data bit.

The data recovery circuit 810 is coupled to a start pattern detection circuit 818, which scans the recovered data for the occurrence of the unique K28.5 start symbol 310 or an inverted version of the start symbol. Once detected, the start pattern detection circuit 818 sends a synchronization signal to the control circuit 820 to synchronize a bit counter, which generates a signal at the end of every 10-bit symbol. Further, the control circuit 820 updates the DSP frame counter 824 with each received frame.

The control circuit 820 detects and verifies the frame synchronization and controls a de-serializer 812, a 10-bit/8-bit decoder 814, and a data descrambler 816 to provide a de-serialized, decoded, and de-scrambled version of the recovered data stream to a de-multiplexer 826, which is controlled by the control circuit 820 to selectively provide de-multiplexed data to the appropriate buffer for subsequent processing.

Figure 9:
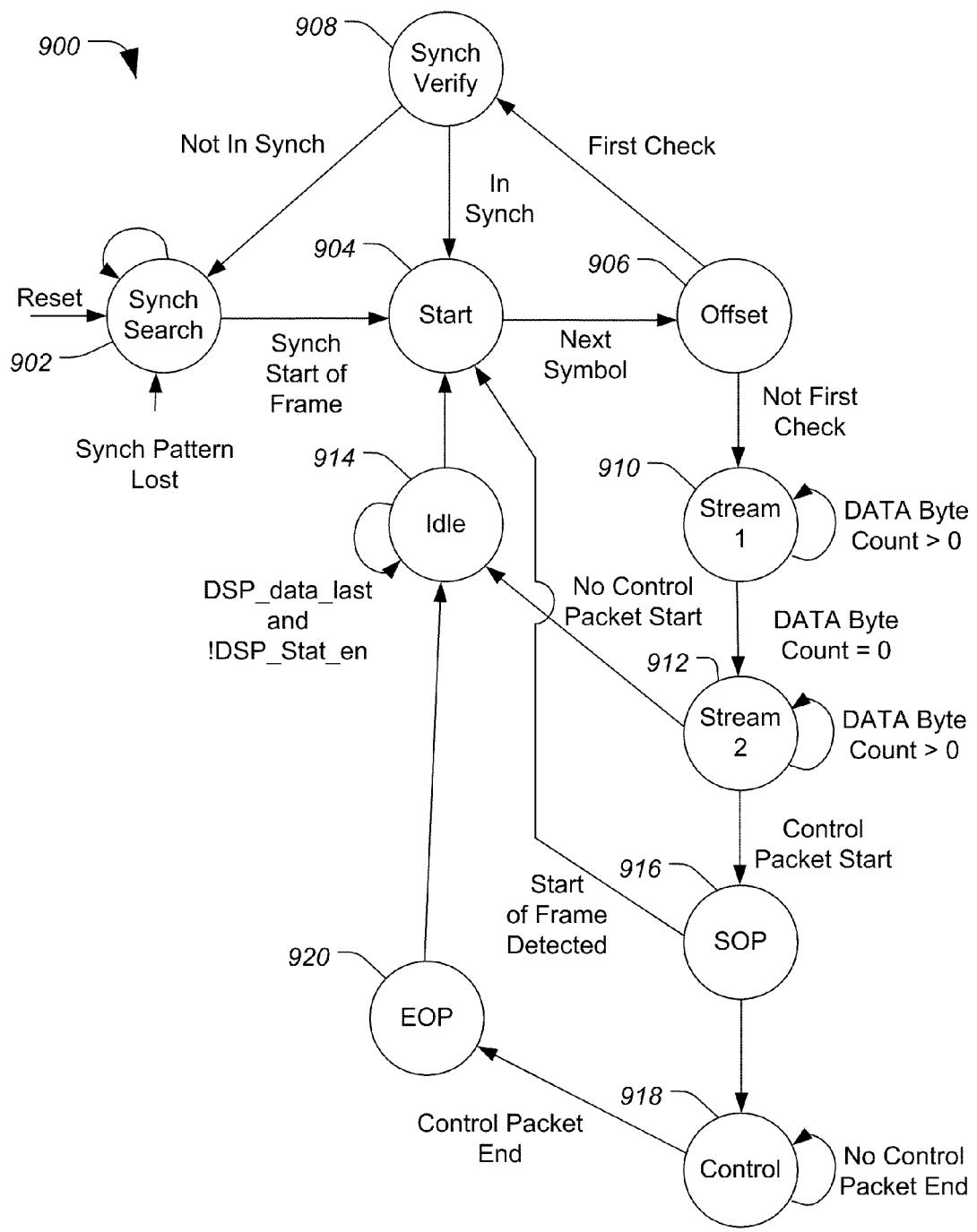
FIG. 9 is a state diagram illustrating a representative example of the operation of the inter-chip link receiver circuit of FIG. 8.

FIG. 9 is a state diagram 900 illustrating a representative example of the operation of the inter-chip link receiver circuit of FIG. 8. In this embodiment, the state machine transitions only at the end of the reception of the 10 bit symbols.

The state machine transitions to a synchronization search state 902 after a reset or when synchronization is lost. A loss of synchronization is detected if the start of frame symbol is not detected where it is expected. When the start of frame symbol (e.g., K28.5) is detected from the synchronization field 302 of the IC link frame 217, the state machine transitions to a synchronization start state 904.

The state machine transitions to the offset state 906 after the next 10 bit symbol, which carries the DSP frame offset, is detected. Upon receipt of the first start symbol after a reset or loss of frame synchronization, the state machine transitions to the synchronization verify state 908. If the state machine is not synchronized, the state machine returns to the synchronization search state 902. Otherwise, the state machine returns to the synchronization start state 904.

Upon receipt of the next start symbol and the 10-bit offset symbol from the synchronization field 302 of the next IC link frame 217, the state machine transitions to the offset state 906 and the DSP offset data 312 from the IC link frame 217 is used to align the data. The state machine then transitions to the stream 1 state 910 in which the data byte counter is loaded with the number of data bytes to be received over the data samples field or channel 304, and counts down after each byte is received, de-scrambled, 8b10b de-coded, then loaded to the appropriate buffer. In this state, the IC link receiver circuit 226 unpacks the first data field 304 of the IC link frame 217. When the byte counter reaches zero, the state machine transitions to a stream 2 state 912.

As the state machine transitions to the stream 2 state 912, the data byte counter is loaded with the number of data bytes to be received over the status samples field or channel 306, and counts down after each byte is received. In this state, the IC link receiver circuit 226 unpacks the second data field 306 of the IC link frame 217. When the byte counter reaches zero, the state machine transitions to the start of packet (SOP) state 916 when a start of packet symbol (e.g., a K28.2 symbol) is detected and transitions to a control state 918 at the end of the next symbol. Otherwise, the state machine transitions to an idle state 914.

When the state machine transitions to the control state 918, the state machine receives the control bytes and writes them to the control buffer 806 (depicted in FIG. 8), until the end of packet (EOP) symbol is detected. The control bytes can be used by the control circuit 234 of the first tuner circuit 202 to control operation of the DSP 224/Upon detection of the EOP symbol, the state machine transitions to the EOP state 920 and then transitions to the idle state 914.

In general, the IC link communication process involves both the IC link transmitter circuit 248 and the IC link receiver circuit 226, which are synchronized to the clock signal of the reference clock 218. The IC link frame 217 is sent from the second tuner circuit 210 to the first tuner circuit 202 through the IC communication link 216, unpacked at the first tuner circuit 226, and then processed using the DSP 224 according to the control data retrieved from the control field 308 of the IC link frame 217.

Figure 10:
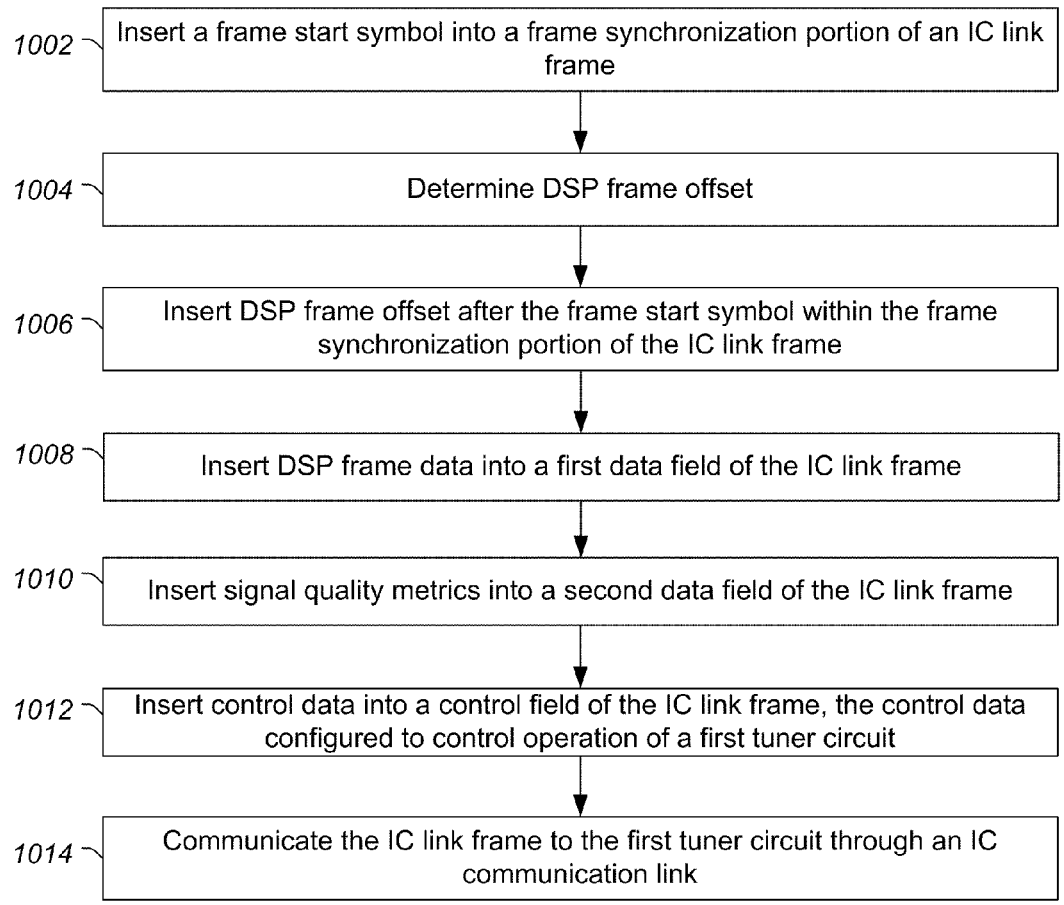
FIG. 10 is a flow diagram of an embodiment of a method of transmitting an inter-chip link frame from a second tuner circuit to a first tuner circuit through an inter-chip communication link.

FIG. 10 is a flow diagram of an embodiment of a method of transmitting an inter-chip link frame from a second tuner circuit to a first tuner circuit through an inter-chip communication link. At 1002, a frame start symbol is inserted into a frame synchronization portion of an IC link frame. The frame start symbol may be a 10-bit start pattern that is inserted by a start pattern insertion circuit 620 through a multiplexer 618 based on instructions from a control circuit 614.

Continuing to 1004, a DSP offset is determined. In an embodiment, the DSP offset is determined based on a difference between a size of DSP frame and a size of the IC link frame. The difference is used to calculate the DSP offset. Proceeding to 1006, the DSP frame offset is inserted within the frame synchronization portion of the IC link frame after the frame start symbol.

Advancing to 1008, DSP frame data is inserted into a first data field of the IC link frame. In an example, the first data field is a data channel. The DSP frame data is data that is processed by a DSP of a tuner circuit based on a digitized version of an intermediate frequency signal derived from an RF signal received by an antenna. The DSP frame data can include both in-phase and quadrature components as well as signal quality metrics.

Moving to 1010, the signal quality metrics are inserted into a second data field of the IC link frame. The second data field can be a second data channel having a different bit rate as compared to the first data field or the control field.

Proceeding to 1012, control data is inserted into a control field of the IC link frame, where the control data is configured to control operation of the first tuner circuit. In an example, the control data can include commands that are intended to be executed by an MCU of the first tuner circuit.

Advancing to 1014, the IC link frame is communicated to the first tuner circuit through an IC communication link. In an embodiment, the IC link frame is provided to an LDVS driver circuit for transmission over the IC communication link.

In an example, the start symbol and the DSP offset can be detected by an IC link receiver circuit and used by a corresponding DSP to synchronize DSP frames prior to performing an antenna diversity operation. In a phase diversity mode, the synchronized DSP frames can be processed to combine the signals to produce a resulting output signal having enhanced signal strength and an enhanced signal-to-noise ratio.

Figure 11:
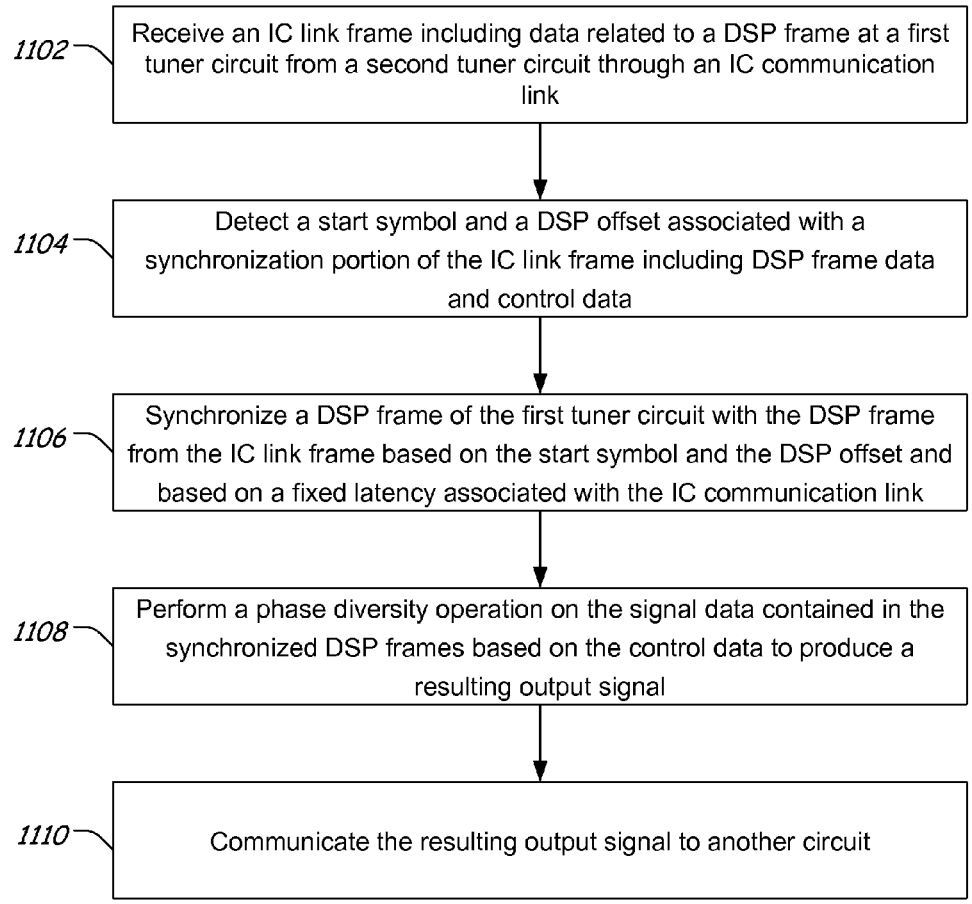
FIG. 11 is a flow diagram of an embodiment of a method of receiving an inter-chip link frame at a first tuner circuit from a second tuner circuit including synchronizing a DSP frame at the first tuner circuit to the received inter-chip link frame.

FIG. 11 is a flow diagram of an embodiment of a method of receiving an inter-chip link frame at a first tuner circuit from a second tuner circuit including synchronizing a radio frequency signal at the first tuner circuit to the received inter-chip link frame. At 1102, an IC link frame is received at a first tuner circuit from a second tuner circuit through an IC communication link, where the IC link frame includes data related to a DSP frame of the second tuner circuit. Advancing to 1104, a start symbol and DSP offset are detected that are associated with a synchronization portion of the IC link frame, which includes DSP frame data and control data. In an example, the IC link receiver circuit performs data recovery, de-serialization, 10-bit/8-bit decoding, data descrambling, and de-multiplexing of the DSP frame after the start of frame symbol and the DSP offset are detected.

Continuing to 1106, a DSP frame of the first tuner circuit is synchronized to the DSP frame from the IC link frame based on the start symbol and the DSP offset and based on a latency associated with the IC communication link. Moving to 1108, a phase diversity operation is performed on the synchronized DSP frames based on the control data to produce a resulting output signal. Continuing to 1110, the resulting output signal is communicated to another circuit. When the control data places the first tuner circuit into a phase diversity mode, for example, the first tuner circuit combines the synchronized DSP frames to produce an output signal having enhanced signal strength and an improved signal-to-noise ratio. When the control data places the first tuner circuit into a switching antenna diversity mode, the first tuner circuit compares the signal metrics and picks the better signal. When the control data places the first tuner circuit in an alternate frequency scan mode, the second tuner circuit transmits the DSP frame data as a demodulated signal within the second data field of the IC link frame, and the first tuner circuit scans the alternate frequency while providing the demodulated data to the data circuit without further processing.

In conjunction with the circuits and methods disclosed herein, transmitter and receiver circuitry is disclosed to communicate DSP frame data between tuner circuits over an IC communication link using IC link frames having multiple channels or fields. A frame synchronization portion of each IC link frame includes a start symbol and a DSP offset, which can be used to synchronize DSP frame data from a second tuner circuit with DSP frame data within a first tuner circuit so that a DSP of the first tuner circuit can perform an antenna diversity operation on the synchronized DSP frames.

Although the present invention has been described with reference to preferred embodiments, workers skilled in the art will recognize that changes may be made in form and detail without departing from the spirit and scope of the invention.

What is claimed is:

1. A tuner circuit comprising:
   circuitry to produce a first digital signal processor frame based on a first radio frequency signal;
   an inter-chip receiver circuit coupled to an inter-chip communication link and configured to receive an inter-chip frame, the inter-chip receiver circuit configured to detect a start of frame symbol of the inter-chip frame and to extract a digital signal processor offset and data related to a second digital signal processor frame from the inter-chip frame; and
   a digital signal processor coupled to the circuitry and to the inter-chip receiver circuit, the digital signal processor to synchronize the first digital signal processor frame with the second digital signal processor frame based on the start of frame symbol and the digital signal processor offset, the digital signal processor configured to perform a selected antenna diversity operation on the first and second digital signal processor frames to produce an output signal.

2. The tuner circuit of claim 1, further comprising a digital interface coupled to the digital signal processor to communicate the output signal to a digital circuit.

3. The tuner circuit of claim 1, wherein the digital signal processor offset is determined based on a difference between a bit length of the second digital signal processor frame relative to a bit length of the inter-chip frame.

4. The tuner circuit of claim 1, wherein the digital signal processor offset changes from a first frame to a second frame when a bit length of the second digital signal processor frame is not an integer multiple of ten.

5. The tuner circuit of claim 1, wherein the digital signal processor offset depends on a least significant digit of a length of the digital signal processor frame.

6. The tuner circuit of claim 1, wherein the digital signal processor offset is periodic.

7. The tuner circuit of claim 6, wherein the period of the digital signal processor offset is less than or equal to ten inter-chip link clock cycles.

8. The tuner circuit of claim 1, wherein the inter-chip frame comprises an eight-bit to ten-bit encoded frame.

9. The tuner circuit of claim 1, wherein the digital signal processor uses the digital signal processor offset to align the first digital signal processor frame to the second digital signal processor frame.

10. A method of synchronizing inter-chip frames, the method comprising:
    producing a first digital signal processor frame related to a radio frequency signal at a first tuner circuit;
    receiving an inter-chip frame at the first tuner circuit from a second tuner circuit through an inter-chip communication link, the inter-chip frame comprising a frame start symbol, an offset, and a second digital signal processor frame;
    synchronizing a first digital signal processor frame to the second digital signal processor frame based, in part, on the offset using the first tuner circuit; and
    performing an antenna diversity operation on the first and second digital signal processor frames to produce an output signal.

11. The method of claim 10, wherein performing the antenna diversity operation comprises combining the first and second digital signal processor frames to produce the output signal.

12. The method of claim 11, further comprising transmitting the output signal to a digital circuit through a digital interface.

13. The method of claim 10, wherein synchronizing a first digital signal processor frame to the second digital signal processor frame comprises:
    detecting the frame start symbol using an inter-chip receiver circuit of the first tuner circuit;
    extracting the offset and the second digital signal processor frame from the inter-chip frame using the inter-chip receiver circuit; and
    aligning the first digital signal processor frame to the second digital signal processor frame using the offset.

14. The method of claim 10, wherein before synchronizing a first digital signal processor frame to the second digital signal processor frame, the method further comprises:
    performing data recovery on the inter-chip frame;
    detecting the start symbol within the inter-chip frame;
    de-serializing the inter-chip frame;
    decoding the inter-chip frame; and
    descrambling the second digital signal processor frame.

15. The method of claim 14, wherein decoding the inter-chip frame comprises performing a ten-bit to eight-bit decoding operation to produce a decoded signal.

16. A circuit comprising:
    a first tuner circuit comprising:
    circuitry to produce a digital signal processor frame based on a first radio frequency signal;
    a digital signal processor coupled to the circuitry and configured to process the digital signal processor frame and to produce associated quality metrics; and
    an inter-chip transmitter circuit coupled to the digital signal processor and to an inter-chip communication link, the inter-chip transmitter circuit configured to construct an inter-chip frame comprising an inter-chip frame synchronization portion and a data portion, the inter-chip frame synchronization portion including a frame start symbol and a digital signal processor offset to a difference in length between the digital signal processor frame and the inter-chip frame, the data portion including data related to the digital signal processor frame.

17. The circuit of claim 16, wherein the digital signal processor offset comprises a value based on a remainder associated with the length of the digital signal processor frame divided by ten.

18. The circuit of claim 16, wherein the digital signal processor offset varies from one inter-chip frame to a next inter-chip frame when the digital signal processor frame is not an integer multiple of ten.

19. The circuit of claim 16, wherein the inter-chip transmitter circuit comprises a data scrambler to scramble the data before constructing the inter-chip frame.

20. The circuit of claim 16, wherein the inter-chip transmitter circuit is configured to transmit control data within a control portion of the inter-chip frame.

21. The circuit of claim 20, further comprising a second tuner circuit coupled to the inter-chip communication link;
wherein the control data is configured to control operation of the second tuner circuit.

22. The circuit of claim 21, wherein the second tuner circuit comprises:
second circuitry to produce a second digital signal processor (DSP) frame based on a second radio frequency signal;
an inter-chip receiver circuit coupled to the inter-chip communication link and configured to receive the inter-chip frame; and
a second digital signal processor coupled to the second circuitry and to the inter-chip receiver circuit, the second digital signal processor configured to synchronize the inter-chip frame to the second digital signal processor frame and to selectively process at least one of the second DSP frame and the inter-chip frame according to an operating mode of the second digital signal processor.

23. The circuit of claim 16, wherein the inter-chip communication link comprises a low-voltage differential signal link.

* * * * *